US009753312B2

(12) United States Patent
Moore (10) Patent No.: US 9,753,312 B2
(45) Date of Patent: *Sep. 5, 2017

(54) NIGHT VISION ENHANCEMENT USING A WEARABLE DEVICE

(71) Applicant: International Business Machines Corporation, Armonk, NY (US)

(72) Inventor: Stephen James Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/849,255

(22) Filed: Sep. 9, 2015

(65) Prior Publication Data

US 2016/0139434 A1    May 19, 2016

Related U.S. Application Data

(63) Continuation of application No. 14/540,522, filed on Nov. 13, 2014, now Pat. No. 9,366,883.

(51) Int. Cl.
| | |
|---|---|
| *G02C 11/04* | (2006.01) |
| *G02C 11/00* | (2006.01) |
| *G01J 1/42* | (2006.01) |
| *G01J 1/16* | (2006.01) |
| *G01J 1/02* | (2006.01) |

(52) U.S. Cl.
CPC ............ *G02C 11/10* (2013.01); *G01J 1/0219* (2013.01); *G01J 1/0238* (2013.01); *G01J 1/16* (2013.01); *G01J 1/42* (2013.01); *G01J 1/4204* (2013.01); *G02C 11/04* (2013.01)

(58) Field of Classification Search
CPC ..... G02C 11/04; G01J 1/16; G01J 1/42; G01J 1/4204
USPC ........... 351/158; 356/51, 213, 214, 229, 230
See application file for complete search history.

(56) References Cited

U.S. PATENT DOCUMENTS

| | | |
|---|---|---|
| 5,486,880 A | 1/1996 | House |
| 2001/0028309 A1 | 10/2001 | Torch |
| 2010/0164990 A1 | 7/2010 | Van Doorn |
| 2011/0221896 A1 | 9/2011 | Haddick et al. |

(Continued)

FOREIGN PATENT DOCUMENTS

| | | |
|---|---|---|
| CA | 2214780 | 9/1996 |
| EP | 2 557 557 A1 | 2/2013 |

(Continued)

OTHER PUBLICATIONS

Littin, "Google Glass: Researcher looks into the future", phys.org, http://phys.org/news/2013-08-google-glass-future.html, Aug. 20, 2013.

(Continued)

*Primary Examiner* — Darryl J Collins
(74) *Attorney, Agent, or Firm* — Scully, Scott, Murphy & Presser, P.C.

(57) ABSTRACT

There is provided a method for improving a night vision by operating a pair of eyeglasses comprising: a sensor that detects an intensity of a light near a user; a comparator device that compares the detected light intensity near the user against a dimness threshold; and an onboard projector in the pair of eyeglasses projecting a red light simultaneously into each eye of the user if the detected light intensity near the user becomes lower than the threshold.

5 Claims, 5 Drawing Sheets

(56) References Cited

U.S. PATENT DOCUMENTS

2012/0203310 A1  8/2012 Pugh et al.
2013/0301034 A1  11/2013 Olds et al.

FOREIGN PATENT DOCUMENTS

| JP | 2008176681 A | 7/2008 |
| JP | 2009222774 A | 10/2009 |
| KR | 102011006307 A | 6/2011 |
| WO | WO9605533 A1 | 2/1996 |
| WO | WO0077547 A1 | 12/2000 |
| WO | WO2012137159 A1 | 10/2012 |
| WO | WO2013036888 A2 | 3/2013 |
| WO | WO2013049248 A3 | 4/2013 |

OTHER PUBLICATIONS

Ackerman, "Could Google glass hurt your eyes? A Harvard vision scientist and project glass advisor responds," Forbes, Mar. 4, 2013, http://www.forbes.com/sites/eliseackerman/2013/03/04/could-google-glass-hurt-your-eyes-a-harvard-vision-scientist-and-project-glass-advisor-responds/.
"How to see in the Dark," wikiHOW, last printed Jun. 10, 2014, http://www.wikihow.com/See-in-the-Dark, pp. 1-4.
Green, "Night Vision," visualexpert.com, last printed Jun. 10, 2014, http://www.visualexpert.com/Resources/nightvision.html, pp. 1-8.
Miller et al., "The Eye and Night Vision," aoa.org, Aug. 2009.

NIGHT VISION ENHANCEMENT USING A WEARABLE DEVICE

CROSS REFERENCE TO RELATED APPLICATION

This application is a continuation of U.S. patent application Ser. No. 14/540,522, filed Nov. 13, 2014, the entire content and disclosure of which is incorporated herein by reference.

BACKGROUND

This disclosure relates generally to an eyeglass, and particularly to an eyeglass having a retinal projection capability.

FIELD OF THE INVENTION

Human eyes require a period of time in darkness to be able to see well in a low-light environment, e.g., a room without any available light. The time period allows photoreceptors (rod cells) in the eyes to adjust to the low-light environment. However, this time period may cause a danger to individuals. For example, an individual who enters a low-light environment may hit an object or wall.

Because the rod cells in a retina in eyes are not stimulated by a long-wavelength light, for example, a red light, a dark environment (e.g., a photography dark room, etc.) often use red lights, red-tinted interfaces, or red goggles/glasses to improve an individual's vision in dark environments. Examples of using red lights and/or red-tinted interface include: (1) a red light in photography dark rooms or zoo displays of nocturnal animals; (2) a red-tinted interface(s) designed for naked-eye astronomy and submarine control rooms. Airline pilots often wear red-tinted goggles or glasses for a period of time before flying at night. Unfortunately, such red lights, red-tinted interfaces, goggles, or glasses are not commonly available in all situations where a user would like to be able to see well in the dark or low-light environments.

Currently, there is available a pair of eyeglasses called Google Glass® (registered trademark of Google, Inc., Mountain View Calif.) which embeds a computing system including a processor device and software applications. Google Glass® enables users to surf the Internet. However, the wearer of current glasses such as Google Glass® is subject to the risk of a phenomena referred to as binocular rivalry and phoria: a latent deviation or misalignment of the eyes that appears when both eyes are no longer looking at the same object.

SUMMARY

In one embodiment, there is provided a method for improving human vision in dark or low-light environments that avoids the risk of binocular rivalry and phoria. The method comprises: providing a pair of eyeglasses having a sensor that can detect an intensity of a light, the pair of eyeglasses adapted to be worn by a user; detecting, by the sensor, the light intensity near the user; comparing the detected light intensity near the user against the threshold; and projecting, by using a light projecting device associated with the pair of eyeglasses, a red light into both eyes of the user simultaneously if the detected light intensity near the user is below the threshold.

In one embodiment, there is provided a pair of eyeglasses for improving a night vision. A sensor detects an intensity of a light near a user wearing the pair of the eyeglasses. A comparator device compares the detected light intensity near the user wearing the pair of eyeglasses against a threshold. An onboard projector in the pair of eyeglasses projects a red light into both eyes of the user upon the detection if the detected light intensity near the user is below the threshold.

In one embodiment, there is provided a computer program product for improving a night vision, the computer program product comprising a non-transitory computer readable storage medium. The computer readable storage medium is readable by a processing circuit and stores instructions run by the processing circuit for performing a method. The method comprises: providing a pair of eyeglasses having a sensor that can detect an intensity of a light, the pair of eyeglasses adapted to be worn by a user; detecting, by the sensor, the light intensity near the user; comparing the detected light intensity near the user against the threshold; and projecting, by using a light projecting device associated with the pair of eyeglasses, a red light into both eyes of the user if the detected light intensity near the user is below the threshold.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Users of Google Glass® (registered trademark of Google, Inc., Mountain View Calif.) and similar glasses are likely to wear or carry the glasses at all time. The ability to use the glasses as an aid for low-light vision saves the user, e.g., a pilot or an amateur astronomer, etc., from having to carry a spare set of red glasses or having to rely on red illumination or red interfaces in order to see well in the dark.

Thus, in one aspect, Google Glass® is modified to include a red-color overlay (i.e., an onboard projector associated with each eyeglass lens) that projects a low level red light to each eye (i.e., retina) of the user while the user is in the dark or a low-light environment. The red-color overlay may simulate an effect of a red light or red lenses, allowing the user to have a better vision in the dark.

The operating principle in achieving this relies on a non-intuitive aspect of ocular physiology. Specifically, the rods in the human retina adjust to dim light by heightening the level of contrast in the images sent to the brain. As a fluke of physiology, red light causes rods to behave as if they are in dim light. In other words, in red-lit environments, the rods send higher contrast images to the brain: the red light allows the eyes to further increase the contrast that allows objects to be seen in dim light. However, it is not intuitive that shining a very low-level of light directly into the eyes will create the same response in the rods as casting red light (from a bulb or other light source) onto the surfaces in the environment.

Figure 1:
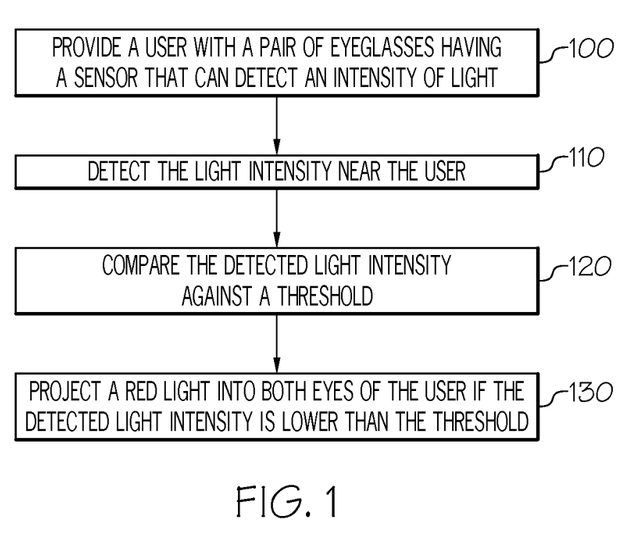
FIG. 1 illustrates a flowchart that describes a method for improving human night vision in one embodiment.
Figure 2A:
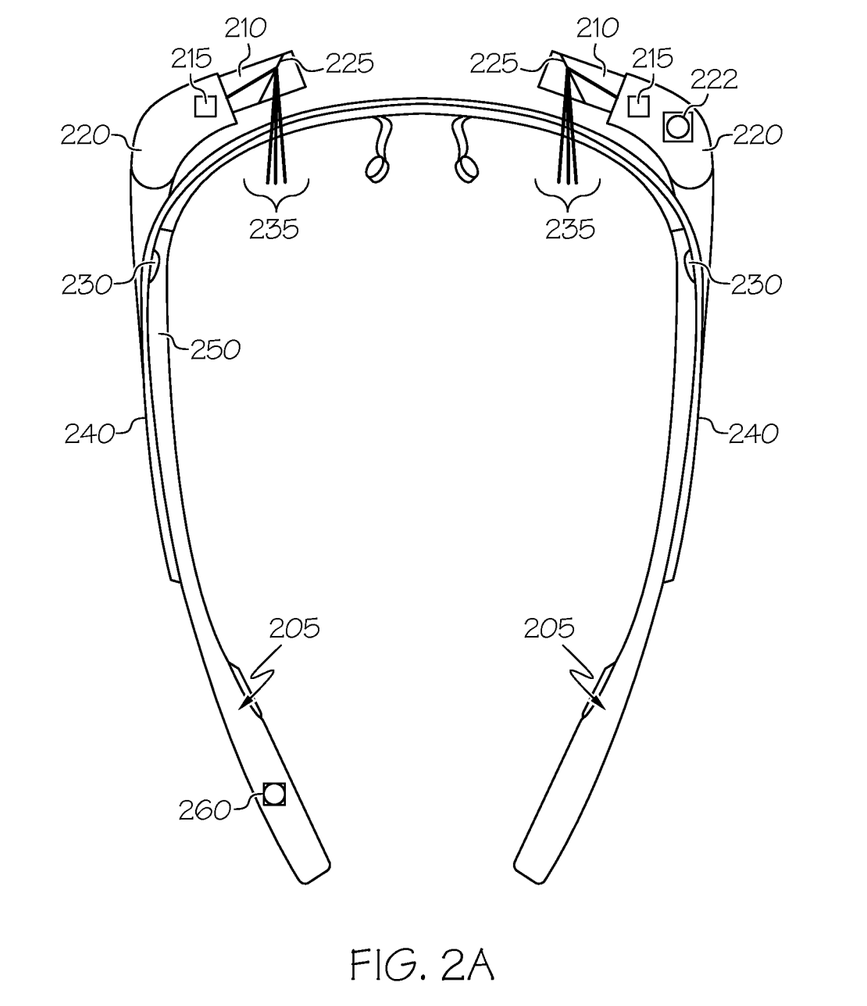
FIG. 2A shows a pair of eyeglasses provided with sensors and an onboard projector configured for improving human vision in dark environments in an exemplary embodiment.
Figure 2B:
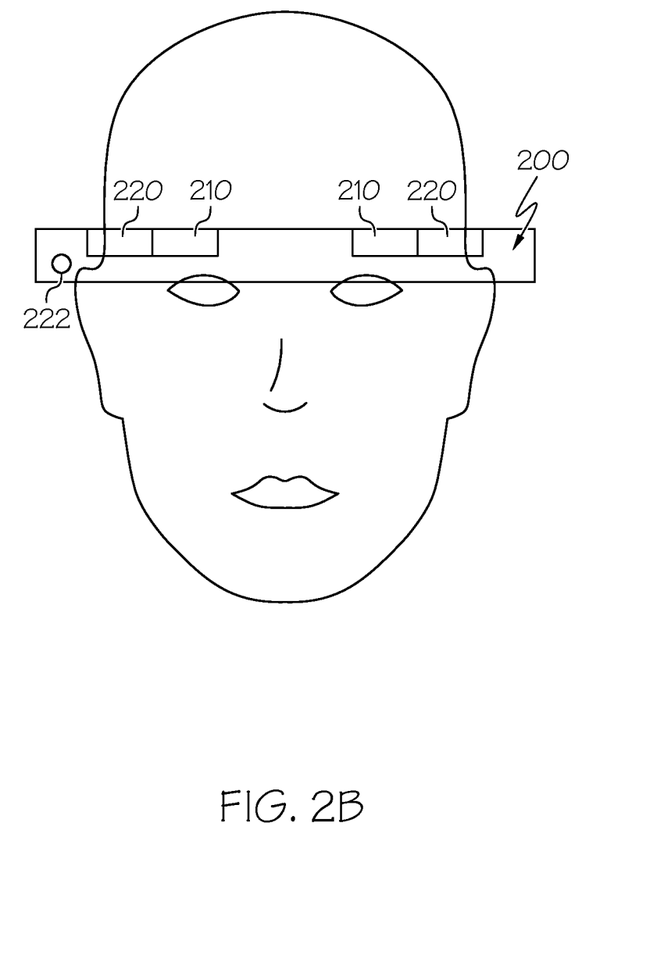
FIG. 2B shows the pair of eyeglasses 200 of FIG. 1 worn by a user.

In one embodiment, there is provided a pair of eyeglasses (e.g., a pair of eyeglasses 200 shown in FIGS. 2A and 2B). The pair of eyeglasses includes, but is not limited to: (1) a sensor 220, e.g., a light sensor—a device detecting an intensity of an ambient light (the sensor 220 may be located in front of lenses of the pair of eyeglasses as shown in FIG. 2B) and, in one embodiment, may be a component of a built in camera or small video camera device 222; (2) an onboard projector 215 associated with each lens for projecting a low level red-light in a retina of each eye responsive to the detected ambient light. In one embodiment, the onboard projector 215 includes, but is not limited to: an optical device that projects an image(s) or a low level red light(s) 235; a low power laser to project an image(s) or a red light(s) 235, etc.; (3) a processor or controller 250 which may be located along an arm 205 of the eyeglass frame; (4) a built-in camera 222 (or small video camera); and (5) and a small power source such as a battery 260 for powering the sensors, the projector, the built-in camera and processor components, etc. FIG. 1 illustrates a flowchart that describes a method run by the pair of eyeglasses shown in FIG. 2A.

Figure 3:
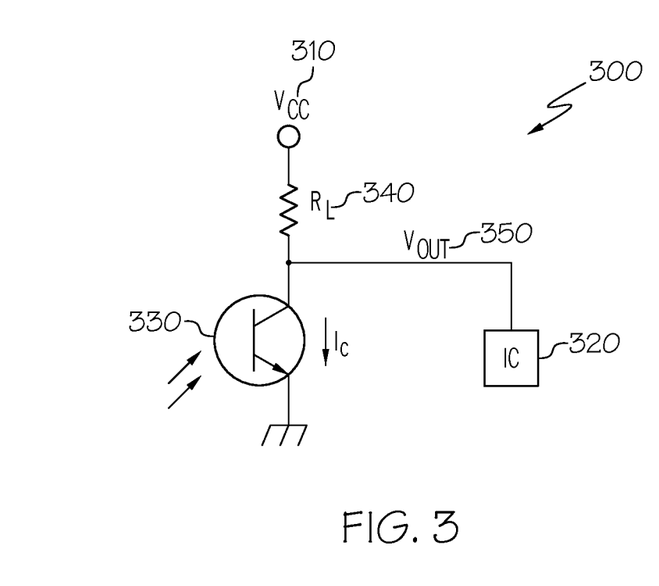
FIG. 3 shows a circuit implemented in the pair of eyeglasses provided that operatively couples the sensors and switches with a controller device (IC) for improving human vision in dark environments in an exemplary embodiment.

FIG. 3 shows a circuit 300, implemented in the pair of eyeglasses 200, which operatively couples the sensors and switches with a controller device (or the processor) for improving human vision in dark environments in an exemplary embodiment. This circuit 300 of FIG. 3 may be a separate circuit incorporated in the device 200 or implemented as a component of the built-in camera or video camera 222 to function as a simple light-level detector. In one embodiment, the circuit directs voltage 310 to an integrated circuit (IC) 320 (a controller or CPU 250) in the eyeglass. In the dark environment, a sensor such as a phototransistor 330 has an impedance 340, higher than a pre-determined threshold, making the voltage out (Vout) 350 close to a power supply voltage Vcc 310, and decreasing the Vout 350 as the phototransistor 330 detects more light. In other words, the darker the environment, the higher the voltage Vout 350 is provided to the integrated circuit 320. Responsive to the higher voltage Vout 350, the (onboard) integrated circuit 320 turns on the red overlay (i.e., the red-light projector). The Vout voltage 350 further turns off the red overlay (i.e., the red-light projector), or changes the intensity of the red overlay (i.e., the red-light projector) depending on the strength of Vout 350. Alternatively, Vout can be used to turn on or off a switch (not shown) for controlling each red-light projector. In one embodiment, the built-in camera 222 uses the circuit 300 as a light level detector to detect an intensity of an ambient light (i.e., light intensity surrounding the user), for example. By using the circuit 300 an inverse relationship is created: When the ambient light (as detected by the built-in camera) is more than the pre-determined threshold, the red light projector turns off or projects a dim red light whose intensity is very low. As the ambient light decreases, the red light projector turns on and increases an intensity of the projected red light in inverse proportion to an intensity of the ambient light.

The brightness of an environment is sometimes referred to as its "luminance". The use of built-in camera 222 in the glasses as a simple digital light meter enables a full image to be collapsed into a single piece of luminance data representing the full environment; and a quick, fine-tuned adjustment to the brightness of the red-light overlay projected simultaneously by on-board projectors into the eyes can then be made.

FIG. 1 illustrates a flowchart that describes a method for improving human night vision in one embodiment. At 100 in FIG. 1, the sensor in the pair of eyeglasses detects an intensity of a light near (e.g., within ten feet from; ambient) the user who wears the pair of eyeglasses. At 110-120 in FIG. 1, the sensor in the eyeglass periodically sends signals representing the detected light intensity to a comparator device or like logic device that compares the light intensity near the user wearing the eyeglasses against a pre-determined threshold. At a certain location, the sensor may detect that the light intensity near the user becomes lower than the threshold. At 130 in FIG. 1, if the light intensity near the user is lower than the pre-determined threshold, the controller sends signals to a switch device operatively coupled to an integrated circuit (e.g., an IC 320 shown in FIG. 3) in the pair of eyeglasses to enable the onboard projector located in front of each lens or arm of the eyeglass frame to project a red light directly into each eye of the user.

In one embodiment, there is provided in the device, coupled with the red light projector device 215 associated with each lens, a transparent prism 210. As shown in FIG. 2A, the projected red light 235 is bounced off of a small mirrored portion 225 of that prism 210 and directly into the wearer's eye. As shown in FIG. 2B, it is understood that the retinal projection portion of device 200 does not obscure the vision of the wearer. The onboard projector 215 projects the red light across as much as the wearer's visual field as possible. This projected red light affects a behavior of receptor cells in retinas, allowing the user to see in a lower light (e.g., a dark environment). The frequency of the red light is approximately $4 \times 10^{14}$ Hz. The circuit 300 shown in FIG. 3 controls or varies an intensity or strength of a red light based on the detected light intensity. The circuit 300 increases Vout 350 in order to increase an intensity or strength of the red light which is inversely proportional to the detected light intensity near the user.

The projecting of the red light may improve a vision of the user in an environment in which the light intensity is lower than the threshold. The projecting the red light into the retina of each eye prevents a binocular rivalry and phoria (i.e., a latent deviation or misalignment of the eyes that appears when both eyes are no longer looking at the same object). In a further embodiment, the user may manually activate the projecting by one or more of: (1) a physical touch on the eyeglasses, such as via a touch sensitive material 240 connected to the a aforementioned circuit as shown in FIG. 3 or by touching a physical switch, e.g., toggle switch or button 230 shown in FIG. 2A; (2) a physical motion of the user, such as detected by a certain type of motion, such as provided by a particular type of motion sensor (not shown), or (3) enabled by a voice activated sensor (not shown) programmed to detect a voice of the user. In another embodiment, in order to increase sensitivity, e.g., vision, etc., of the both eyes to the low-light environment, the processor is programmed and activated by sensor detection below the threshold to configure the projected light from the eyeglasses to automatically shine the red light simultaneously into the eyes of the user when the sensor detects a low-light, e.g., a room without any available light.

Figure 4:
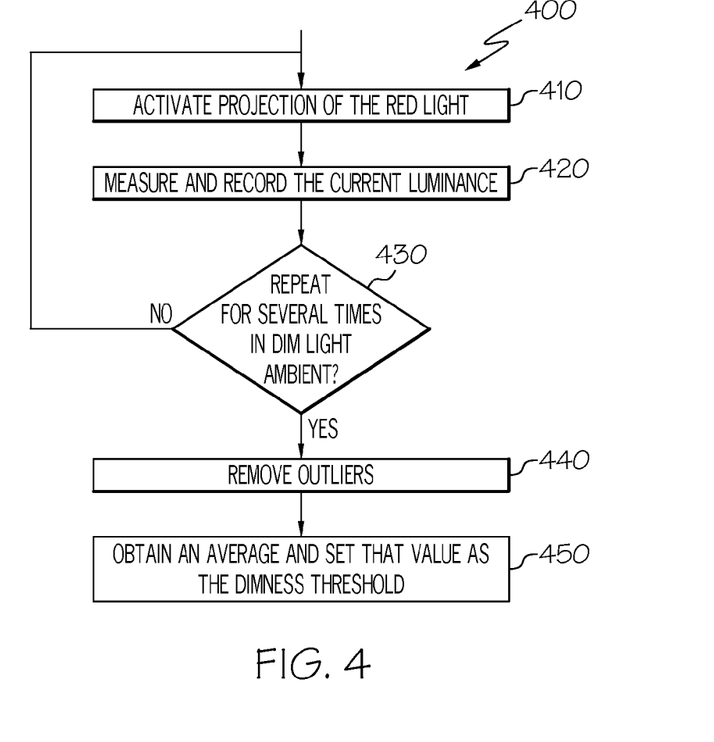
FIG. 4 shows a method for personalizing a calibration of a dimness threshold for the pair of eyeglasses of FIG. 2A.

As different human eyes have different sensitivities to light a "dimness" threshold (a gradual change of luminance from brightness to dark) will vary from person to person—and it must be calibrated. FIG. 4 depicts one embodiment of a personal calibration method 400 for the eyeglasses:

In a first step 410, in a "dim" ambient light, the user initiates the simultaneous projection of the red light manually (whether activated by voice, touch, or gesture) whenever he or she wishes to see in the dim light environment. Each time the user activates the red light, the device measures and records the current luminance value at 420.

These steps 410 and 420 are repeated for several measurements, e.g., five to ten measurements but can be less or more. Thus, at 430 one it is determined that five or ten current luminance measurements have been made, the device can then perform the following:

At 440, eliminating as outliers any measurements that represent true darkness. This would be exemplified, for instance, by any measurements taken when a person suddenly enters a a dark environment or room, such as, for example, when the power goes off all of a sudden. Measurements of sudden darkness do not help find a dimness threshold for the particular user. Rather, the measurement data should represent a gradual change in the luminance. Measurements taken at times when the ambient light fades gradually, is used for determining at what point the red overlay is simultaneously engaged for each lens to improve that user's vision. Thus, at 450, armed with a set of such measurements for detecting a gradual change in luminance, an average luminance value is obtained and that value is set as that user's personal dimness threshold. Thereafter, the red overlay can be automatically projected at each lens of the user's glasses whenever the ambient luminance of the user's environment falls below his or her personal dimness threshold. Simultaneous projection of the red overlay into the retina of each eye is important to prevent a binocular rivalry and phoria.

Figure 4A:
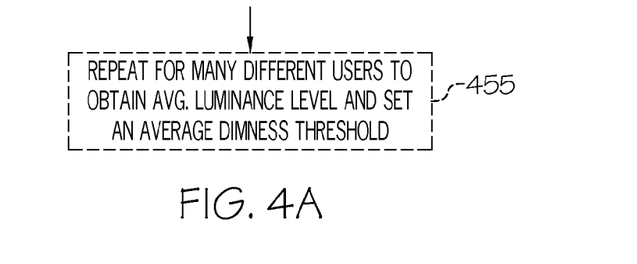
FIG. 4A shows the calibration method of FIG. 4 generalized for multiple users.

In a further or alternate embodiment, shown at step 455, FIG. 4A, the device can be calibrated with a default setting based on testing with many users. For example, multiple users can wear the device, with each user performing the method steps 400 of FIG. 4. The luminance of the test environment may then be adjusted until all the users determine the best threshold for themselves. Then, the method calculates an average threshold based on the thresholds obtained for all the users and pre-programs the device with that threshold at 455. The device can allow the user to manually adjust this default setting. As the user makes adjustments, the device records those measurements and automatically alters the default so that it works for the individual user.

Figure 4B:
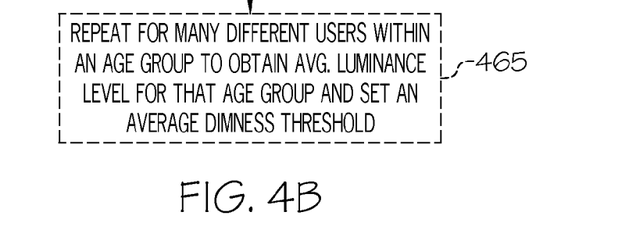
FIG. 4B shows the calibration method of FIG. 4 generalized for multiple users within a certain age range.

As a slight refinement of the pre-calibration model, as shown in an alternate embodiment at step 465, FIG. 4B, the device can be tested to find several default settings based on age. For example, an average threshold for individuals in a certain age group or range may be obtained. Example age ranges may include a range from 15 to 30 years old; from 30 to 45 years old, and from 45 to 80 years old. In this embodiment, with multiple users of a certain age range performing the method steps 400 of FIG. 4, the luminance of the test environment is adjusted until all the users of the certain age range determines the best threshold for themselves. Then, the method calculates an average threshold based on the thresholds obtained for all the users of that age group and pre-programs the device with that threshold at 465. In this embodiment, the glasses can offer the user those three default settings and allow the user to choose the setting appropriate for his or her age.

In one embodiment, the methods shown in FIG. 1 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the method shown in FIG. 1 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include anon-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for improving a night vision, the method comprising:
   providing a pair of eyeglasses with a sensor that can detect an intensity of a light, the pair of eyeglasses adapted to be worn by a user;
   detecting, by the sensor, the light intensity near the user;
   comparing the detected light intensity near the user against a dimness threshold; and
   projecting, by using a light projecting device associated with each lens of the pair of eyeglasses, a red light simultaneously into both eyes of the user if the detected light intensity near the user is below the threshold, said simultaneous projecting of red light into both eyes of the user to prevent a binocular rivalry and phoria.

2. The method according to claim 1, wherein the projecting comprises:
   receiving a command from the user; and
   using the light projecting devices, automatically projecting the red light simultaneously to the each lens of the pair of eyeglasses upon the receiving the command.

3. The method according to claim 1, further comprising:
   calibrating said eyeglasses to determine a threshold for a user, said calibrating comprising:
   adjusting a red light projected in a dim ambient light;
   measuring and recording the current luminance;
   repeating the adjusting, measuring and luminance recording for different ambient light environments; and
   obtaining an average value of the measured luminances as a dimness threshold for said eyeglasses.

4. The method according to claim 1, wherein the pair of eyeglasses includes a built-in camera for recording a luminance of an environment near the user as an image.

5. The method according to claim 1, further comprising: activating the projecting by one or more of:
   a physical touch on the pair of eyeglasses, a physical motion of the user, or a voice of the user.

* * * * *